UNITED STATES PATENT OFFICE.

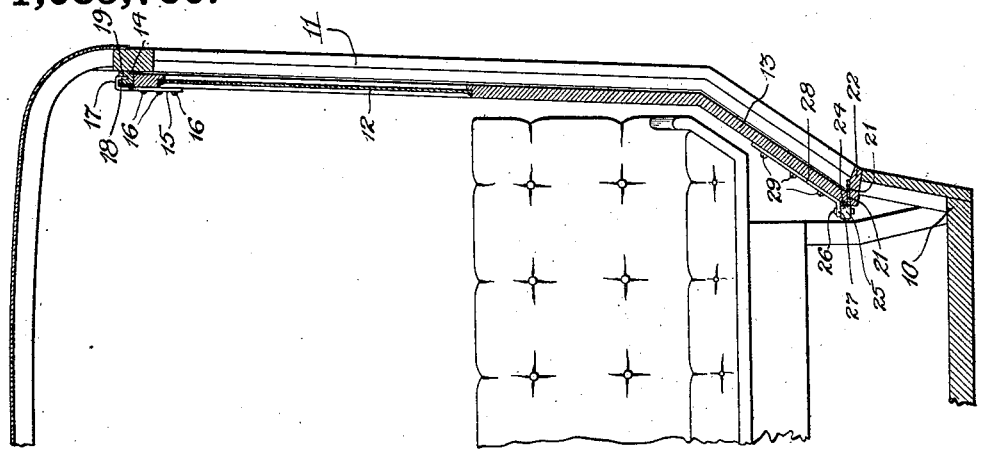

WILLIAM H. SCHWARTZ, OF HOOPESTON, ILLINOIS; MARTHA E. SCHWARTZ ADMINISTRATRIX OF SAID WILLIAM H. SCHWARTZ, DECEASED.

SLIDING DOOR.

1,085,760.   Specification of Letters Patent.   Patented Feb. 3, 1914.

Application filed January 11, 1911. Serial No. 602,042.

*To all whom it may concern:*

Be it known that I, WILLIAM H. SCHWARTZ, a resident of Hoopeston, in the county of Vermilion and State of Illinois, have invented certain new and useful Improvements in Sliding Doors, of which the following is a full, clear, and exact description.

The present invention relates to sliding doors and designs more particularly to provide devices for mounting such doors in such manner that all rattling will be avoided on vehicles or other places where the doors are subjected to vibration.

The invention further designs to provide means for mounting a sliding door so that it will not only be secured against rattling, but will also provide a snug fit or joint between the door and the structure in or on which it is slidably mounted, to protect the interior of the vehicle-body from the elements.

The invention consists in the novel features hereinafter set forth and more particularly defined by claims at the conclusion hereof.

In the drawings: Figure 1, is a vertical longitudinal section of a vehicle embodying the invention. Fig. 2, is a vertical section taken on line 2—2 of Fig. 1. Fig. 3, is a detail section through the lower portion of the door and its guiding and holding means.

The invention as shown, is embodied in a vehicle equipped with a suitable body 10 having an opening 11 in one or both of its sides, which is closed by a sliding door 12. The lower portion of this door is inclined inwardly, as at 13, to conform to the shape of the side of the vehicle-body.

An overhead track 14 is secured to the body at the inner side thereof, and is formed with a groove 19 in its upper face. Each door has secured thereto a pair of metallic brackets or hangers 15, and these brackets are secured to the inner side of the door 12 by screws 16, said brackets having their upper ends formed with outwardly extending portions 17 adapted to pass over or overlie the upper face of the track 14, and are also formed with downwardly extending ends or tongues 18, which fit in groove 19 in the upper face of the track 14, which is usually formed of hardwood. These brackets serve to slidably sustain the door and secure the upper portion of the door against lateral movement so that it will not rattle when subjected to vibration.

A track 21 is secured to the threshold 22 of the vehicle-body and this track is angular in cross-section, being formed of angle iron, and has its horizontal flange securely fastened to the threshold by screws 23, and the vertical flange 24 of this track serves as an abutment on which the door may slide and against which the door will be snugly held by guide-rollers 25 which are journaled on bolts 26, which are secured to a horizontally extending portion 27 of brackets 28 which are secured to the inner side of the door by screws 29. The lower edge of door 12 is angular in cross-section to form a face 30 adapted to engage the outer-side of flange 24 of track 21 and a bottom edge 31 adapted to conform to the upper face of the horizontal flange of track 24. Roller 25 is formed of elastic material, such as rubber, and is provided with a metallic bearing-sleeve 33. This elastic roller serves to effectively hold the inner side of edge 30 of the door snugly against the vertical flange of the track and effectively prevent the lower portion of the door from rattling, as result of the vibration of the vehicle-body and also forms a joint, which will prevent the wind or dust from entering the vehicle.

The invention thus provides a sliding door which is particularly adapted for vehicles, and which is hung or mounted against vibration relative to the structure in which it is hung and by which a snug fit is provided between the door and the supporting structure. The devices for mounting the door are simple and may be produced at low cost.

The invention is not to be understood as being restricted to the details, illustrated and described since these may be modified by the skilled mechanic without departing from the spirit or scope of the invention.

What I claim as new and desire to secure by Letters Patent is:

1. The combination with a door, of a track having a groove in its upper face, brackets on the door provided with means extending into said grooves to hold the door laterally, an angular track adjacent the lower edge of the door, and rollers sustained by the door for holding the lower portion of the door against the vertical flange of the track, said flange being disposed between the rollers and the door.

2. The combination with a door, of a track, hangers for the door, a vertically extending guide against which a portion of the door fits, and elastic means sustained by the door for holding the door against said vertically extending guide, the latter being disposed between the door and said elastic means.

3. The combination with a door, of a track, hangers for suspending the door from the track, an angular bar having one of its flanges secured to the frame-work and a vertically extending flange, the door having its lower portion formed to fit against one side of said vertical flange, and rollers formed of elastic material mounted on the door and engaging the other side of said vertical flange.

4. The combination with a door, of a track having a groove in its upper edge, brackets secured to the door, and extended over said tracks and into said groove, an angular bar having a horizontal flange secured to the frame work and a vertically extending flange, the door being formed to engage one side of said vertically extending flange, brackets secured to the lower portion of the door, and rollers journaled in said brackets end engaging the other side of said vertically extending flange.

5. The combination with a door, of a track having a groove in its upper edge, brackets secured to the door and extending over said tracks and into said groove, an angular bar having a horizontal flange secured to the frame-work and a vertically extending flange, said door having an angular lower edge conforming substantially to the angle of said bar, one of the faces of said angular edge fitting against one side of the vertical flange of said bar, brackets secured to the door and rollers mounted in said brackets and engaging the other side of said vertical flange.

6. The combination with a door, of a track having a groove in its upper edge, brackets secured to the door and extending over said tracks and into said groove, an angular bar having a horizontal flange secured to the frame-work and a vertically extending flange, said door having an angular lower edge conforming substantially to the angle of said bar, one of the faces of said angular edge fitting against one side of the vertical flange of said bar, brackets secured to the door and elastic rollers mounted in said brackets and engaging the other side of said vertical flange.

7. The combination with a door, of a track having a groove in its upper face, brackets on said door provided with tongues, the upper edge of the door being disposed under said track, an angular track against both faces of which the lower edge of said door is formed to fit, and means carried by the door for holding the door in engagement with said angular track.

WILLIAM H. SCHWARTZ.

Witnesses:
 JOHN B. WALLBRIDGE,
 SAM'L YOUNG.

Copies of this patent may be obtained for five cents each, by addressing the "Commissioner of Patents, Washington, D. C."